United States Patent [19]

Doiron

[11] 4,268,962
[45] May 26, 1981

[54] FINGER HELD SCISSORS
[75] Inventor: Joseph G. Doiron, Saugus, Calif.
[73] Assignee: Donald Doiron, Saugus, Calif.
[21] Appl. No.: 135,208
[22] Filed: Mar. 28, 1980
[51] Int. Cl.³ .............................................. B26B 13/00
[52] U.S. Cl. ........................................ 30/261; 30/257
[58] Field of Search ................. 30/254, 261, 232, 257, 30/259; 128/318

[56] References Cited

U.S. PATENT DOCUMENTS

| | | | |
|---|---|---|---|
| 848,966 | 4/1907 | Carlson | 30/261 |
| 1,757,173 | 5/1930 | Dingman | 30/261 X |
| 2,497,587 | 2/1950 | Corley | 30/261 |
| 2,676,404 | 4/1954 | Peckron | 30/261 |
| 3,003,236 | 10/1961 | Castelli | 30/261 X |
| 4,189,831 | 2/1980 | Sonntag | 30/232 |

FOREIGN PATENT DOCUMENTS 2822705  11/1978  Fed. Rep. of Germany ........... 128/318

*Primary Examiner*—Jimmy C. Peters
*Attorney, Agent, or Firm*—Charles R. Fay

[57] ABSTRACT

A flytyer's scissors having a loop to place it on the operator's midfinger to dangle, and including a bowed-out arc to be pressed by the thumb against the forefinger to actuate the blades.

9 Claims, 2 Drawing Figures

U.S. Patent

May 26, 1981

4,268,962

FINGER HELD SCISSORS

BACKGROUND OF THE INVENTION

In the tying of flies, the flytying thread must be severed and feathers, chenille, wool, tinsel, and other flytying materials must also be severed and often shaped several times during the tying of the fly. This makes it necessary to drop the flytying bobbin and other tools and materials to pick up the scissors and sever whatever the material is.

The object of the present invention is to provide an extremely lightweight, finger held pair of scissors so that it is always on the hand, ready for immediate use, thereby saving time as well as avoiding the necessity, in some cases, to hunt around for the scissors and pick them up, use them for their intended purpose, and then put them down again.

SUMMARY OF THE INVENTION

The scissors of the present case are made of two lengths of flat steel stock in the form of ribbon or tape. One length is provided with an expansible steel coil at one end to fit on the midfinger of the hand of the flytyer. This piece has a run extending past the forefinger to a positon where the same may be operated easily by pressing it with the thumb. When not in use, the scissors are simply dropped in a rotary motion about the midfinger, to a position where they are out of the way and do not interfere with the thumb and forefinger which are mainly used to tie on the various flytying materials and to wind and tie the flytying threads.

Figure 1:
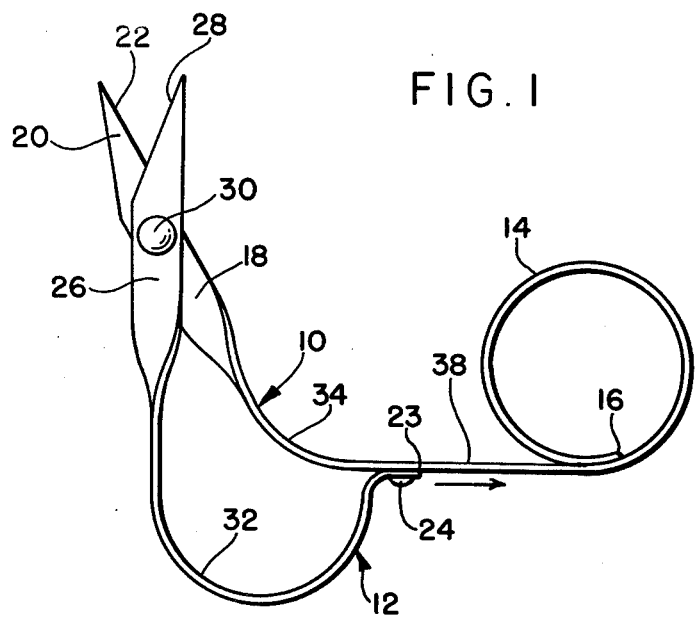

The length of the flat ribbon steel which extends from the expansible coil above referred to is turned 90° at its other end into a tapered hardened and operative point which is sharpened along one edge. The second length of the scissors also has a 90° tapered sharpened point for cooperation with the one described. The severing ends are flatly interpivoted for the scissor action. The second length is shorter then the first length and extends toward the thumb in a semirounded or arced portion having a free end bearing on the flat surface of the first length or run of the scissors, that is, the free end contacts the first length and bears thereon in a sliding relation under influence of the thumb. This provides a very easily operated pair of scissors which is extremely lightweight and which may be continuously held on the midfinger of the flytyer during the entire tying of the fly. When not in use, it is completely out of the way and does not interfere with the thumb and forefinger of the flytyer who therefore is able to pursue his flytying process in the usual manner. The arc of the second length of ribbon steel maintains the scissor cutting edges apart, so that the user need never open the scissors as they are automatically self-opening. FIG. 1 is a plan of view illustrating the flytying scissors and FIG. 2 is a perspective view illustrating the same in operation.

Figure 2:
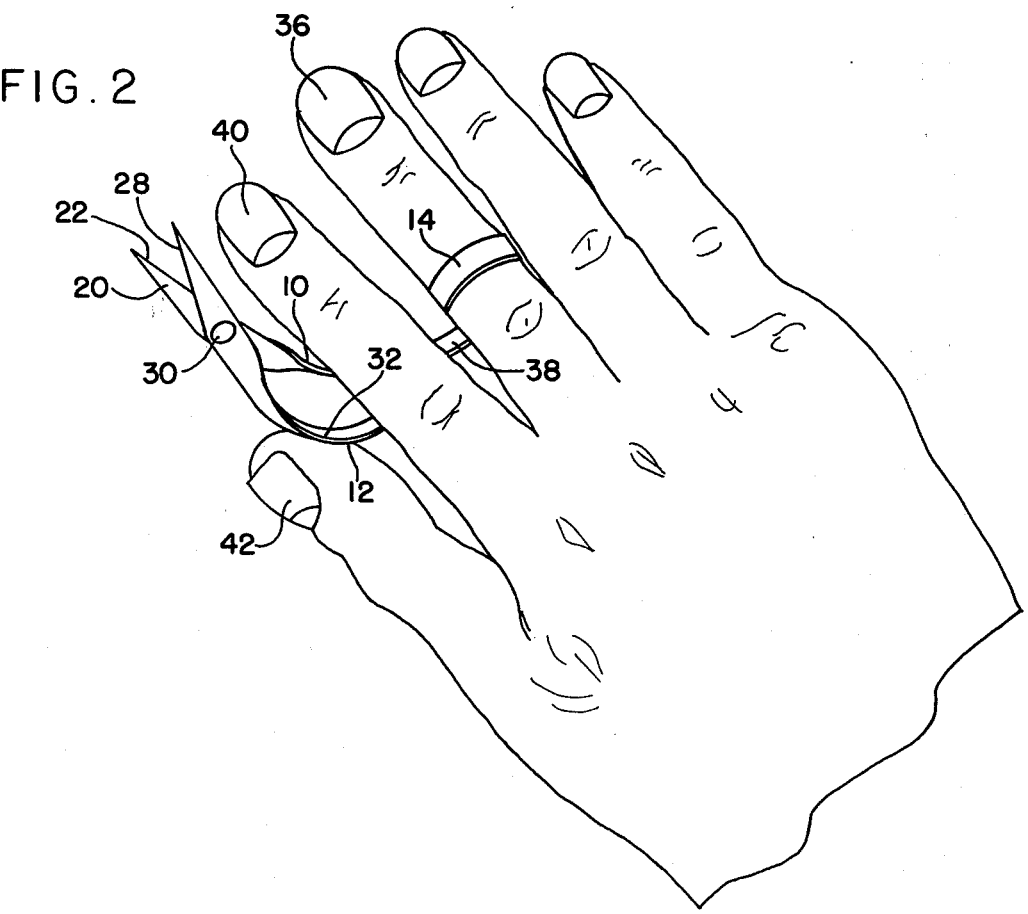

In the drawing, FIG. 1 is a plan view of the invention, and FIG. 2 is a view showing the invention in use.

PREFERRED EMBODIMENT OF THE INVENTION

It is to be understood that the entire flytyer's scissors device herein is made of flate resilient steel in the form of a ribbon which may be less than a quarter of an inch wide and thin enough to be very lightweight. The scissors comprise two main parts which are of different lengths and these are indicated at 10 and 12. The length 10 is the longer and terminates at one end in an expansive coil or ring 14 which has a free terminal end 16 having a certain diameter which may be easily increased according to the size of the midfinger of the operator, so that the scissors may be comfortably held thereby.

At the opposite end of the steel strip 10, it is turned at 90° as at 18 and is cut unto a taper shown at 20 to make a blade having an edge 22 that is sharpened.

The other length of steel ribbon 12 terminates at one end as at 23 in a free end that is separate from and slides on the midpoint area of length 10. A brass rivet or the like 24 acting as a slide bearing may be used.

The steel length 12 is also turned 90° at 26, cut off in a taper along edge 28, which is sharpened. The blades are riveted to form a pivot 30. Intermediate the blade edge 28 and free end 23, the length 12 is considerably bowed or arced outwardly as at 32.

In the use of the device as shown in FIG. 2 the expansible ring 14 is placed on the midfinger 36 which it very lightly grips and is rotatable thereon. The midstrip of the ribbon 10 at 34 passes under the forefinger 40 to a position where the bowed out portion 32 of ribbon 12 is in position to be engaged by the thumb 42. A light squeeze by the thumb with respect to the forefinger which engages the opposite side of the bend in length 10 which is indicated at 34 in FIG. 1, causes the scissors to be actuated to cut the material quickly and easily by sliding the end at 23 in the direction of the arrow, along the portion 38 of length 10.

When not in use, the thumb releases the scissors which then merely rotates on the midfinger and dangles to a position where it is completely out of the way of the thumb and the forefinger which are the fingers normally used in applying flytying material to the hook.

It will be seen that an extremely lightweight but effective severance tool is provided which may be continually held in the flytyer's hand and is easily flipped from the dangling nonuseful position to the operative position as shown particularly in FIG. 2.

I claim:

1. A pair of scissors comprising a pair of lightweight steel ribbonlike members,
   said members having cutting edges at corresponding ends and including a pivot pivoting said members together for the severing operation,
   one member extending for relatively longer length and terminating in a finger hold,
   the second being provided with an intermediate curve forming an arc extending away from the first named member, and terminating in a free end slidably associated with a midpoint area of the first member.

2. The scissors of claim 1 wherein the fingerhold is spaced from the cutting edges for a distance accommodating the forefinger of the user when the fingerhold is placed on the midfinger of the user.

3. The scissors of claim 1 wherein the arc of the second member is adapted to be engaged by the thumb of the user which then may work against the forefinger to operate the scissors in the severing action thereof.

4. The scissors of claim 1 wherein the free end of the second member has a radius forming a bearing to slide on the mid-area of the first member.

5. The scissors of claim 1 including means forming a bearing at the terminal free end of the second member.

6. The scissors of claim 1 wherein the fingerhold is expansible.

7. The scissors of claim 6 wherein the fingerhold is in the form of a coil having an interior free end.

8. A pair of scissors comprising a pair of steel ribbon-like members having corresponding sharp ends for the severing operation, the first member extending from its sharpened end and terminating in a ringlike fingerhold, the other member extending from its sharpened end in a relatively enlarged arc forming a bow portion extending away from the first member and terminating in a portion slidably bearing on the portion of the first member between its fingerhold and sharp end.

9. The scissors of claim 8 wherein the midportion of the first member is comparatively straight, and the fingerhold is spaced from the sharp end.

* * * * *